United States Patent [19]

Dano

[11] 4,398,195
[45] Aug. 9, 1983

[54] METHOD OF AND APPARATUS FOR GUIDING AGRICULTURAL AIRCRAFT

[75] Inventor: Paul K. Dano, Euless, Tex.

[73] Assignee: Del Norte Technology, Inc., Euless, Tex.

[21] Appl. No.: 85,284

[22] Filed: Oct. 16, 1979

Related U.S. Application Data

[63] Continuation-in-part of Ser. No. 53,771, Jul. 2, 1979, abandoned.

[51] Int. Cl.³ .............................................. G01S 13/78
[52] U.S. Cl. .................................. 343/6.5 R; 343/7.3; 343/15
[58] Field of Search ......................... 343/6.5 R, 7.3, 15

[56] References Cited

U.S. PATENT DOCUMENTS 3,648,286  3/1972  Schoneborn ........................ 343/7.3
4,083,047  4/1978  Schalow ............................ 343/15 X
4,231,093 10/1980  La Vance et al. ............ 343/6.5 LC X
4,234,924 11/1980  La Vance et al. ............ 343/6.5 LC X Primary Examiner—T. H. Tubbesing
Attorney, Agent, or Firm—Louis Bernat

[57] ABSTRACT

A microprocessor controls a radar trilateralization system, used on board an aircraft to provide pattern flying. A suitable hard wired board may be added to the microprocessor to enable it to read out any suitable flight pattern. A plurality of transponders are set up at known positions to establish a baseline. Then, by using known radar techniques, the system feeds radar derived, distance information into the microprocessor. The microprocessor calculates the airplane's position from these radar signals, relates that position to the X, Y grid locations in a desired flight pattern, and then gives an instrument readout. The pilot keeps a display of the instrument over an appropriate index, and the airplane flies over the entire predetermined flight pattern.

20 Claims, 21 Drawing Figures

MULTIPLE PARALLEL

GRID

EXPANDING RACETRACK CONSTANT RADIUS

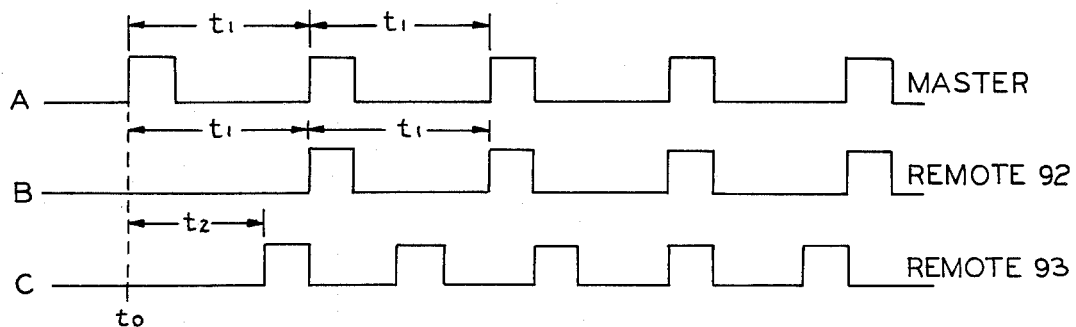
FIG.4
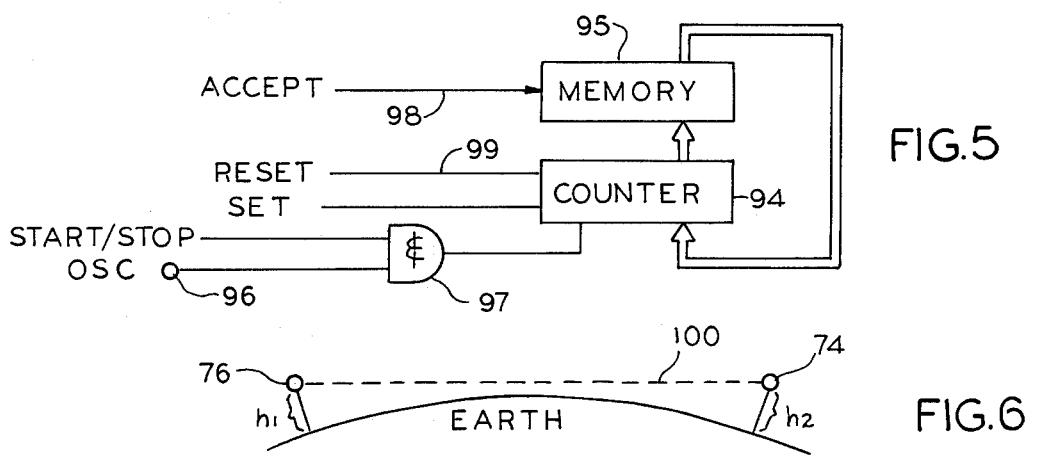
FIG.5
FIG.6
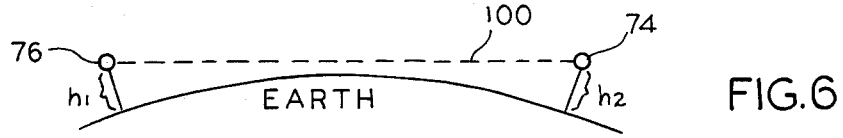
FIG.7
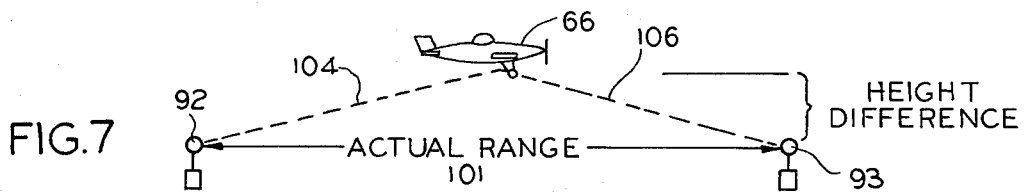
FIG.8
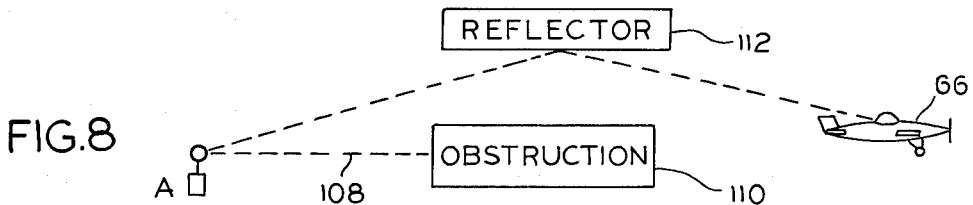
FIG.9
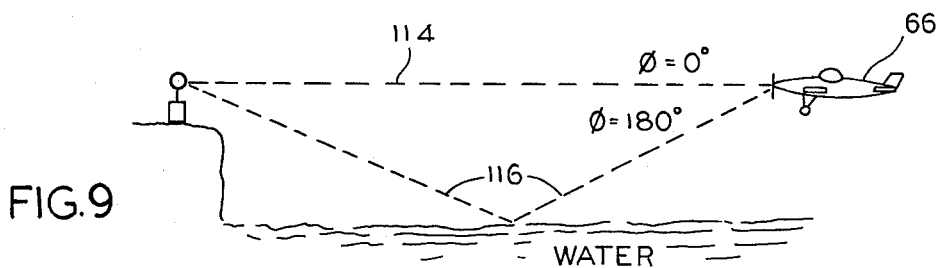

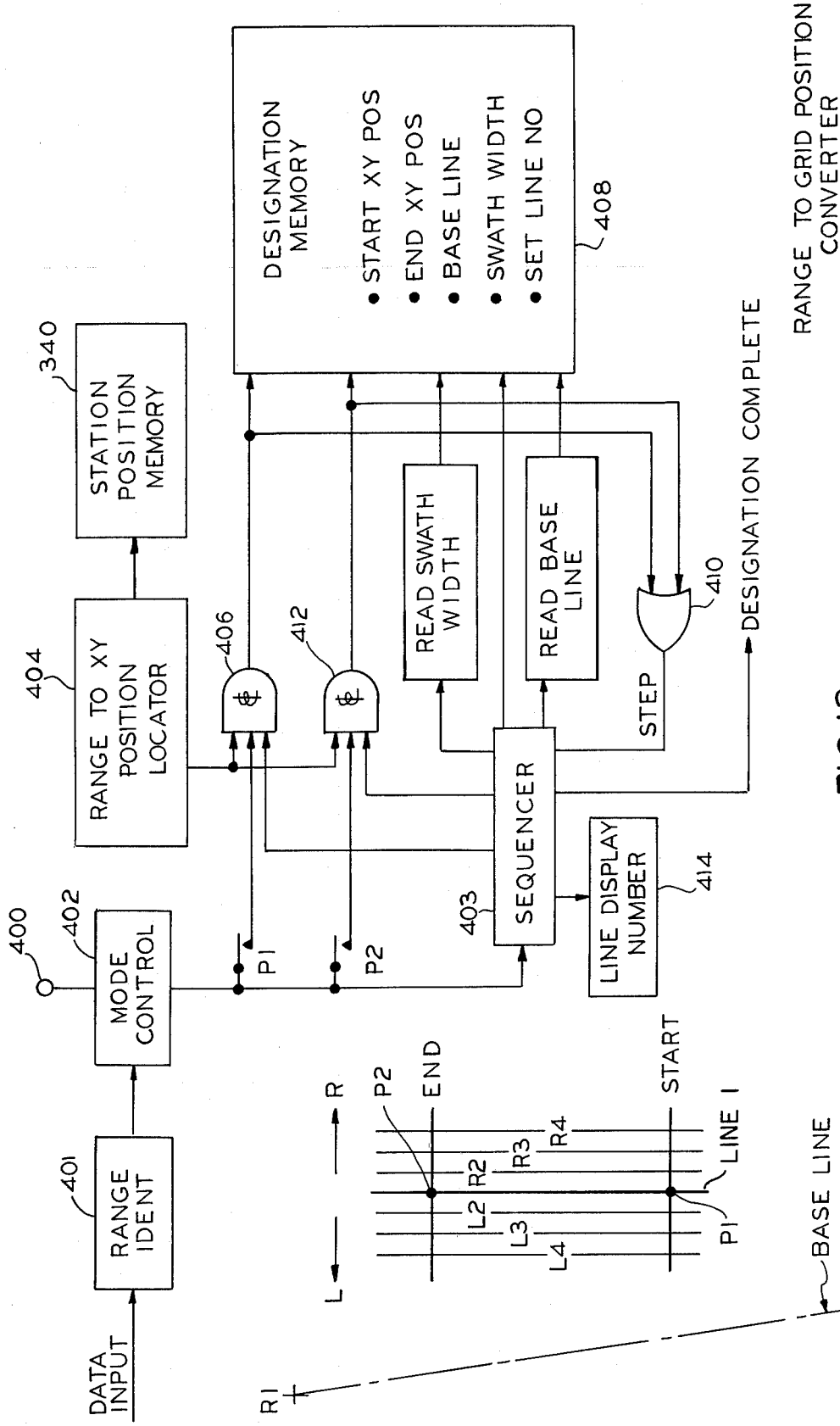
FIG.13
FIG.14

METHOD OF AND APPARATUS FOR GUIDING AGRICULTURAL AIRCRAFT

This is a continuation-in-part of my co-pending application Ser. No. 53,771, filed July 2, 1979, now abandoned.

This invention relates to radar guidance systems having control over vehicular motion, and more particularly to methods of and apparatus for guiding aircraft, and especially agricultural aircraft while engaged in pattern flying.

For a better understanding of this disclosure, reference may be made to the following patents owned by the assignee of this invention: Merrick U.S. Pat. No. 3,810,179, entitled "RADAR TRILATERALIZATION POSITION LOCATORS", issued May 7, 1974; Dano U.S. Pat. No. 3,938,146, entitled "SECURE ENCODER FOR TRILATERALIZATION LOCATOR UTILIZING VERY NARROW ACCEPTANCE PERIODS", issued Feb. 10, 1976; and Metcalf U.S. Pat. No. 4,115,773, entitled "SYNCHRONIZED PULSE AMPLITUDE CONTROL FOR PULSE MEASURING CIRCUITS", issued Sept. 19, 1978.

These three patents relate to vehicular guidance systems especially well suited for use on boats which are prospecting for under water petroleum deposits. A master control unit, mounted on the vehicle, transmits cyclically recurring radar signals to transponders located at known intervals along a "baseline". Each transponder is individually identified by a pulse repetition rate of the recurring radar pulses. Only the transponder which is individually identified by the transmitted pulse repetition rate replies to any given signals. Equipment on the boat calculates the vehicular position, through a use of trilaterialization, since the baseline distance between responding transponders is known, and since the distances between the vehicle and the activated transponders are found from the radar signals.

The inventions described in these three patents relate primarily to the guidance of a boat or ship which is exploring for petroleum deposits under the sea. Those ships can travel in only the two dimensions of the surface of the water, and only at relatively slow ship's speed.

Airplanes, on the other hand, travel in three dimensions, and at relatively high speeds. Also, airplanes experience many more disruptive transmission factors since there are many more extraneous objects to reflect radar signals and give false readings to an aircraft.

Hence, there are many differences between the guidance problems for aircraft, boats, and ships. Also, these problems require the aircraft to be controlled quickly and in a greater number of different ways.

There are many examples which could be cited to illustrate how and why an aircraft may require a guidance system. For example, an aircraft may be used to photograph, to make maps, to dust crops, to make air-sea rescue searches, or to do many other things while flying back and forth over a limited area. In each case, the main interest is in obtaining a very uniform coverage with no gaps and a minimum of overlaps. By way of a non-limiting example only, the following remarks are directed primarily to dusting of crops or forests.

Conventionally, a crop duster begins with the map of a limited area, such as 1,000 acres, for example. Then he lays out a flight pattern which uniformly covers the entire 1,000 acres. For example, if the aircraft lays down a spray or other material over a swath which is, say, 44 feet wide, the pilot draws a pattern of parallel lines on the map of the entire 1,000 acres, each line being spaced from its neighboring lines by a distance representing 44 feet. (The inventive system can accommodate a range of swath widths such as 1 to 10,000 feet wide, for example.) Then, the pilot calculates a flight pattern which enables him to fly along those lines in the fastest and least expensive manner.

After the pilot decides upon the flight pattern, a flagman on the ground is usually positioned at the end of a flight path to hoist a flat or target at which the pilot aims, in order to fly over the predetermined flight pattern. The flagman then moves to the end of the next flight path, while the pilot circles and then returns to aim at the flag in the new location.

A difficulty with this system is that the pilot is limited to weather and light conditions where he can see the flagman, and to speeds which enable the flagman to move from place-to-place. The flight pattern is also limited by the possible movements of the flagman. Therefore, it is not always the most economical flight pattern. For example, if the flagman must continuously cross a river after every flight path, that pattern cannot be conveniently used, as a practical matter, even if it is by far the best utilization of the aircraft. Moreover, the flight pattern canot be any more accurate than the flagman's position. The choice may be either to spend a lot of time and money to mark preselected flagman positions or to trust the flagman's judgement as he moves from row-to-row. None of these alternatives is very attractive.

Accordingly, an object of the invention is to provide new and improved vehicular guidance systems. Here, an object is to give an aircraft pilot a maximum flexibility by enabling him to select a pattern to fit a field by a simple flip of a switch and keying in of certain preselected data.

Another object of the invention is to enable a pilot to work 24 hours, day or night, in any kind of weather which is safe enough to permit flying.

Yet another object of the invention is to give a pilot a form of control wherein he may fly over a part of a pattern, stop the pattern flying whenever it is convenient to do so, return to an airport for refueling, and then return to exactly the point where he stopped the pattern flying and thereafter complete the flight pattern as if he had never interrupted his work. In a similar manner, an object is to enable the pilot to make a record of a particular reference point, such as a point for another vehicle to complete a rescue operation. In this connection, an object is to enable a permanent record to be kept of all pertinent flight pattern information.

Still another object is to enable a use of faster flying aircraft or a plurality of simultaneously flying aircraft to complete the pattern flying operation in a shorter time period.

In keeping with an aspect of the invention, these and other objects are accomplished by providing a microprocessor for controlling the radar trilateralization system described in the above-identified patents. The microprocessor may be programmed to read out any suitable flight pattern. Conveniently, the fligh pattern may be built onto a printed circuit card which may be plugged into the master radar equipment. A plurality of transponders are set up at known positions relative to a baseline. Then, using radar techniques described in the three patents, the system feeds radar derived information into the microprocessor. The microprocessor calculates the airplane's position from the radar signals, relates that position to the desired flight pattern, and then gives an instrument readout. The pilot only has to keep a needle of the instrument over an index (or the equivalent) on a meter dial and the airplane will fly over the entire predetermined flight pattern.

In the following description it will be convenient to refer to microprocessors. While any of many different such processors may be used, one embodiment used an MSC6500 which is fully described in a book entitled "Microcomputer Family Hardware Manual" (Revision A), Publication Number 6500-10A, published Jan. 1976, by MOS Technology, Inc., 950 Rittenhouse Road, Norristown, Pennsylvania 19401.

A preferred embodiment of the invention may become more apparent from a study of the attached drawings, wherein:

FIGS. 4A through 4C are graphs representing three trains of radar pulses and illustrating how the transponders respond to their individually identified signals;

FIG. 5 is a block diagram of the part of the microprocessor which is used to validate and average radar signals;

FIGS. 6 through 9 illustrate a few exemplary problems which an aircraft encounters when it is guided by radar;

FIG. 13 is a block diagram of a converter for translating the radar range signals into X, Y coordinates on a grid of the flight pattern;

FIG. 14 is an exemplary schematic grid of flight lines within a sprayed area which applies almost universally to mot of the flight patterns of FIG. 2, and others;

FIG. 16A shows the flight pattern memory plugged into a microprocessor;

Figure 1:
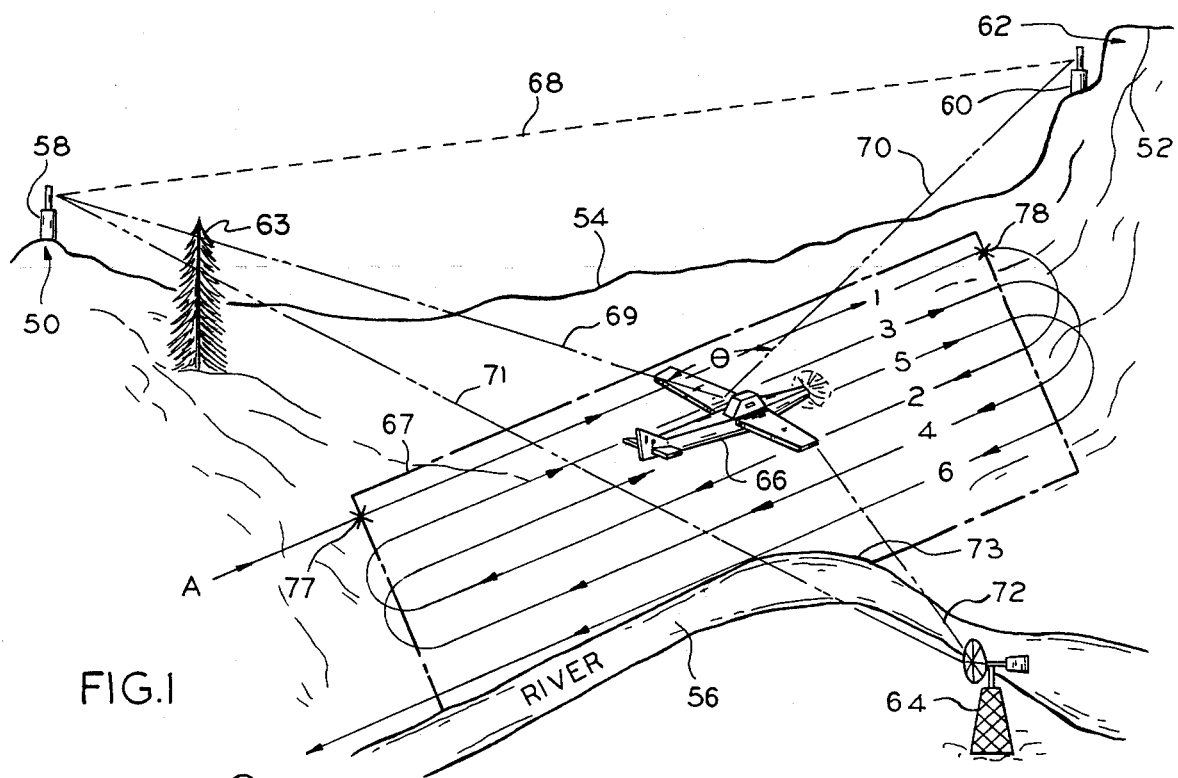
FIG. 1 is a pictorial representation illustrating how the invention may be used to spray a forest or for crop dusting, for example.

The problems of an airborne radar guidance system of the described type are set forth in FIGS. 1 and 6–9. In greater detail, FIG. 1 shows two mountain peaks 50, 52 separated by a forest land which begins at a ridge 54 and runs down a fairly steep incline to a river 56. One transponder 58 may be placed on the highest point 50 of one mountain peak, but the other transponder 60 must be placed at a point which is lower than the other mountain peak because there is a steep cliff 62 which is too difficult to climb. In this example, a very tall tree 63 is quite near transponder 58 to interfere with transmission and a windmill 64 is positioned to act as a passive reflector of radar signals.

The pilot of airplane 66 is assigned the task of spraying trees growing within the geographical area enclosed by a single dot-dashed line 67. The plane of the surface of the field is badly skewed with respect to a plane, defined by aircraft 66 and two transponders 58, 60 at the ends of the reference baseline 68. Also, the pilot must fly in one horizontal plane while the sprayed area lies in another horizontal plane. Therefore, in order to spray the trees, the pilot must fly over the vehicular travel or flight pattern represented by paths "1"–"6", shown by lightly inked solid lines, while being guided by radar signals referenced to the guidance plane defined by the baseline 68 and the aircraft position. There are further complications since the tree 63 delays the propagation of the radar pulses and therefore produces an error effect upon the distance reading, and since reflections from the windmill appear to be a third transponder in the area.

Therefore, the microprocessor on board the airplane must correct for these and many other errors which become apparent only while the guided flight is actually in progress. It must respond to only the signals represented by the double dot-dashed lines 69, 70, and must reject the signals represented by the triple dot-dashed lines 71, 72.

Figure 2:
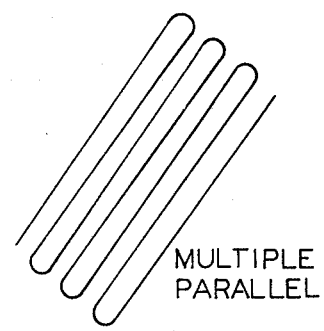
FIG. 2 represents a number of optional vehicular travel or flight patterns which may be placed in a microprocessor for controlling the aircraft position.
Figure 2:
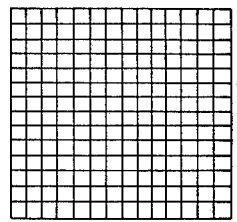
Figure 2:
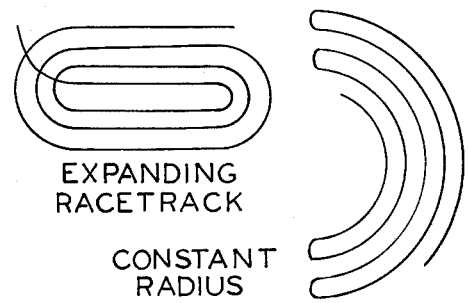

If the natural landmarks, mountain peaks, river, etc., were drawn differently in FIG. 1, the flight pattern could become much different. For example, a somewhat semicircular flight pattern must be best if spraying is concentrated around the bend 73 in the river. Accordingly, a number of different typical flight patterns are shown in FIG. 2. It could be a little more complicated to correct some of these flight patterns than to correct others.

In order to start the guidance process, the pilot sets up the two transponders 58, 60 at convenient locations within transmission range. As here shown, transponders 58, 60 are positioned to define a baseline 68 which is more or less parallel (but inadvertently skewed somewhat) with respect to the proposed flight pattern. The master control unit on the airplane and the transponders 58, 60 generally operate as described in the Merrick U.S. Pat. No. 3,810,179.

The radar guidance system transmits over line-of-sight distances. For most aircraft that are likely to use the system, this means that the guidance is available for distances up to about 50 miles. If so, the remote transponder stations (FIG. 3) will probably use an 87°×6° antenna pattern 74. The master station aboard the aircraft will likely use a 360°×20° antenna pattern 76. The aircraft should fly at positions where the angle θ (FIG. 1) between lines 69, 70, extending from the aircraft to two transponders, is not less than 30° or more than 150°; a range of 60° to 120° is preferred; and 90° is best. The combined heights of the aircraft and each of the two transponder antennas should be high enough to "see" over the horizon. The aircraft should work no closer to the baseline 68 than ten times the difference between the altitude of the aircraft and the heights of the individual transponder antennas. Of course, other antennas may also be used and the parameters would be interrelated in a similar manner.

The distance between the transponders (i.e., the length of the baseline 68) could be fond in any well known manner, and then that length is used as a basis for the system calculations. However, an actual survey or physical measurement is not necessary since the inventive radar system is a distance measuring system and therefore can directly calculate the length of the baseline. The pilot merely flies toward the baseline 68, and the distances 69, 70 to the two transponders are measured continuously. The sum of these two distances becomes shorter, and as the aircraft crosses the baseline 68, there is a characteristic dip or shift in the signal. Moreover, the microprocessor is programmed to detect the points where the measured distances, represented by the two dot-dashed lines 69, 70, cease getting shorter and start getting longer. At that point, the sum of the two distances is the length of the baseline. The minimum sum of these two distances is stored in the microprocessor as the length of the baseline.

The pilot may fly back and forth across the baseline 68 many times if he is concerned about the accuracy of the reading. For example, one baseline reading could be too long if the pilot is flying much higher than the transponders. Therefore, the minimum sum is always the most nearly correct reading.

During this intial flying to find the baseline length, the onboard mircroprocessor is programmed to reject all readings if the sum of the two do not cross over from the descending distances to the ascending distances. Therefore, if the pilot only approaches the baseline and turns away before he crosses it, the processor does not store any reading and a rejection light is displayed to the pilot.

The microprocessor MP is preprogrammed with the desired flight pattern. A simple way of doing this is to provide a plurality of optional hard wired logic boards PL, each of which has been constructed to store a particular pattern. Thus, if the pilot wishes to fly a "race track" pattern, he plugs in or switches to a race track pattern, printed circuit board and then keys or otherwise stores in certain data (using a cockpit control console). One way of storing such data is to fly over visual check points and push buttons when the aircraft is in a visually oriented, correct position. Such data may include geographical data such as the length and width of the area, the swath width, and the like. If the pilot wishes to fly a constant radius pattern, for example, he plugs in or switches at MM to a different printed circuit board and keys in the same data.

With the selected flight pattern, and with a pre-flight storage of an area length, width, swath width, etc. for the sprayed area, and with the microprocessor finding and storing the length of the baseline 68, the pilot begins his approach from point A, flying toward visual check points which have been preselected as a boundary of the flight pattern. In this example, the pilot visually flies over an initial path between points 77, 78 and the sprayed area lies on only one side of that initial path. In another example, the initial path could be any place in the sprayed area (i.e., a center line or an off-center line, or the like). For example, one point could be a prominent rock formation or a large tree, and the other point could be a ranger lookout station, a parked automobile, or the like. Perhaps the pilot merely flies alongside a railroad, highway, or fence.

As the pilot crosses the check point 77 at the start of the initial path, and again at the check point 78 on the other end of the initial path, he pushes suitable buttons to mark the start and the end of the flight pattern. Thereafter, the onboard microprocessor continuously keeps a running memory record of the airplane's location in the preprogrammed flight pattern, relative to the check points, the transponders, and certain other pertinent data, such as the direction of flight, swath width, etc. A meter in the pilot's line of vision has a needle or other suitable indicator (such as a bar graph) which may be held over a mark to automatically cause the airplane to fly over the preset flight pattern, regardless of how that pattern turns or angles.

Suppose, for example, that the pilot exhausts the supply of the chemical that he is spraying while his airplane is flying along path "5", in the position seen in FIG. 1. Heretofore, the pilot could not have started path "5" because he would have known from his gauges that he would run out of the chemical spray in the middle of the path. Therefore, he would have had to carry the weight of the unsprayed chemical, which could have been, but was not, deposited on path "5", back to his base for refueling. Once there, he would have, in effect, taken on less than a full load of chemical spray because his hopper was not initially empty. These considerations are important because some chemicals are too expensive to spray in double doses and other chemicals are too dangerous if sprayed too heavily. Also, the fuel cost for needless weight is an important factor.

Since the microprocessor continuously stores a memory of the aircraft position, it is possible to identify the exact point in the flight pattern where the hopper of chemical spray becomes empty. The pilot only has to return into the area and position the aircraft so that the index needle, or other display, controlled by the guidance system is over the correct point on a dial. The spraying begins when the aircraft reaches the exact point where spraying last terminated, if the pilot is then flying in the correct direction. If the pilot should approach the path from some other direction, a warning light comes on and the pilot circles until the light goes out, which means that he is then following a correct compass course.

If the aircraft were flying an air-sea rescue mission, for example, the pilot would push a button when he sees the object of the search directly beneath his plane, and there is a similar storage of a point location. The microprocessor could telemeter information relating to the location of the aircraft at the identified point. Thereafter, another aircraft or a boat could return to the exact point where the aircraft was located when the pilot pushed the button.

The flight path guidance in the vertical dimension depends upon a pilot's needs. Usually, a pilot visually flies the airplane, at an altitude which is comfortable to him. However, there are existing instruments used commercially in instrument landing systems (ILS) which have a horizontal needle that guides the pilot along a given glide slope or at a fixed altitude. These same instruments may be easily used with the Merrick radar system.

The system is a discrete system, as distinguished from an analog system. A series of readings are taken at half-second intervals. As soon as an acceptable series of readings are received, the microprocessor calculates the location of the aircraft and displays it. The calculations are based upon a self-calibration which the system made when the pilot originally flew across the baseline. Thereafter, as the aircraft travels back and forth over the preprogrammed flight pattern, the microprocessor updates its position, with respect to the baseline 68, every half-second.

As Merrick explains, inconsistent data is rejected. Therefore, the reflections from the windmill, represented by a three dot-dashed line 71, 72, are rejected as being inconsistent with the data acquired when the baseline was found. Likewise, if transmission is distorted by the tree 63, the resulting radar reading is also rejected as inconsistent. For example, if the microprocessor first calculates the aircraft position and then a half-second later detects that it is flying backward or has suddenly accelerated to an unbelievable speed, the microprocessor rejects the data derived from the radar pulses giving the unbelievable reading. A few seconds later, the disturbing effects of tree 63 are gone and the aircraft appears to be at a location which is reasonably consistent with previously stored locations. The microprocessor then accepts that data and again displays the aircraft position. At electronic speeds and high aircraft speeds, the chances are very good that the pilot will never know that, for perhaps as much as a few seconds, he was flying without guidance. However, the problem is usually moot because the aircraft cannot respond quickly enough to stray off course in the conventionally short time while a nearby object is distorting the radar readings.

The vehicular or flight pattern of FIG. 1 is known as a "race track" pattern. FIG. 2 shows and identifies a plurality of other typical vehicular or flight patterns which are often used by crop dusters, or the like. The inventive radar guidance system may be used with any of these or similar patterns. In general, the pilots prefer flight patterns which do not require tight turns, since the larger radius turns are safer and may be made at higher speeds. Therefore, the race track is generally considered the more preferable of these patterns.

The objective of the system is to cover an area uniformly. Therefore, it is not too important whether the tracks are lying along a true compass course, or are in exactly the originally contemplated orientation. If the wind is blowing the airplane along a path which is, say, 10° off the true course, then all of the parallel paths are also 10° off the true course. Thus, the flight pattern remains a series of parallel lines and the coverage is as uniform as it would have been if the wind were not blowing.

When the flight pattern requires more than two transponders, say, four or five, they may be set up along different baselines. The aircraft could then fly a first pattern relative to the positions of the first two transponders, a second pattern relative to the positions of the second and third transponders, and a third pattern relative to the positions of the third and fourth transponders, etc.

Also, the flight pattern may be used in other ways. For example, assume that the aircraft is spraying all cornfields in a very large area (say, 10 miles × 10 miles). If the cornfield is thought of as the black squares on a checkerboard which exactly covers the large area, then the radar guided flight pattern could cover the entire checkerboard with, say, the race track pattern. The spraying apparatus would be activated only while the aircraft is crossing over the cornfields (or the black squares of the checkerboard) and de-activated while crossing over the non-cornfield areas (or the red squares).

Figure 3:
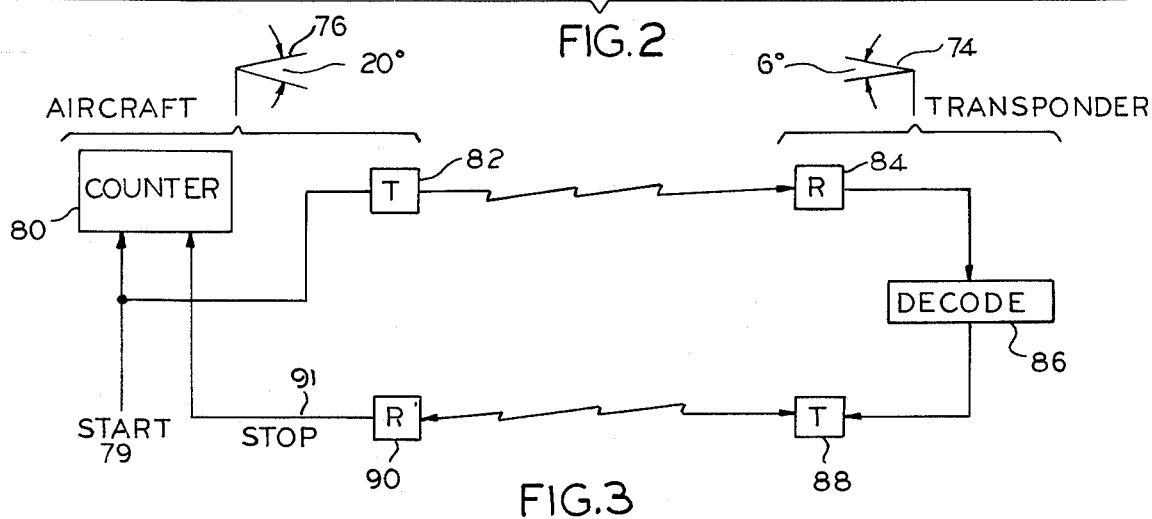
FIG. 3 is a block diagram illustrating how the inventive system operates.

In greater detail, FIG. 3 briefly and simply illustrates the system described in the Merrick patent. A start signal 79 starts a counter 80 and simultaneously triggers a transmitter 82 to transmit a radar pulse. At a remote transponder location, a receiver 84 picks up each radar pulse, analyzes it at 86 to determine whether the pulse is addressed to it, and, if so, triggers a transmitter 88 to send a reply pulse. The receiver 90 in the aircraft picks up the reply pulse and, acting via wire 91, stops the counter 80.

The count which is stored in counter 80 represents the total gross time required for the round trip of the pulse. From this gross time, it is necessary to subtract a period caused by inherent circuit delays between the time when the start signal appears at 79 and the transmitter 82 actually sends a radar pulse. There is a similar delay in the return caused by the characteristics of the "stop" line 91. Likewise, there is a delay (called the "turn around time") between a receipt of a pulse at receiver 84 and the transmission of the reply pulse at the transmitter 88. After these delays are subtracted from the gross time, the remainder is the actual distance measurement between the aircraft and the transponder.

FIGS. 4 and 5 illustrate how the microprocessor identifies the responding transponders, which is essentially the same as the identification in the Merrick patent. The "master" station is onboard the aircraft. By setting digital switches on the master unit, any suitable time period (such as $t_1$, $t_2$) may be selected. Thereafter, the master station sends out a radar pulse at the start of each selected time period. In FIG. 4A, there is a stream of outgoing radar pulses, each separated from the other by the time period $t_1$.

Each transponder begins measuring a preset time period every time that it receives a radar pulse. In FIG. 4B, remote transponder 92 is equipped to measure the time period $t_1$ following the receipt of each radar pulse. This period coincides with the spacing of the transmitted pulses. Therefore, transponder 92 responds to the signals of FIG. 4A. However, transponder 93 is equipped to measure the time period $t_2$. The train of pulses to which it responds (FIG. 4C) do not coincide with the spacing of the transmitted pulses (FIG. 4A) and, therefore, transponder 93 does not respond. If a few of the pulses in FIG. 4C should occasionally coincide with the transmitted pulses, the microprocessor rejects them as being inconsistent with the previously received train of pulses.

If the pilot wishes to measure distances to transponder 93, he sets digital switches to select time period $t_2$. The pulses in FIG. 4A then become spaced, at the time $t_2$, as shown in FIG. 4C. Thereafter, transponder 93 responds and transponder 92 does not respond since its internal time period $t_1$ would not coincide with the presently transmitted time period $t_2$.

FIG. 5 shows the simple arrangement of a counter 94 and a memory 95 used with the microprocessor to count the number of acceptable radar pulse signals that are received from the transponder. A crystal controlled oscillator 96 is gated through AND gate 97 during the interval between a start and a stop signal while the two inputs of the AND gate are marked. From FIG. 3, it is seen how the count stored in the counter 94 represents the apparent round trip distance between the master station and the replying transponder.

Any suitable equipment (shown in the Merrick patent) may be provided for validating the apparent round trip distance. For example, if the running tally stored in memory 95 indicates that the apparent distance is changing at a rate which is appropriate for an aircraft traveling at, say, 150 miles per hour, it would be inconsistent for the aircraft to suddenly appear to accelerate to, say 500 miles per hour within a fraction of a second.

In operation, the start input is marked before a pulse is transmitted. Then, a radar pulse is transmitted and simultaneously the counter 94 begins to count the pulses in the output of the oscillator 96. When the return radar pulse is received, the count stops. If that count is consistent with preceding counts, the accept input 98 is marked. The count just stored in counter 94 is transferred into memory 95. If the count just stored in counter 94 is inconsistent with preceding counts, accept input 98 is not marked and nothing is transferred from counter 94 into memory 95. Either way, the reset input 99 is thereafter marked and the counter 94 is reset to zero. Then, the next pulse is sent and returned with a similar result.

If an unacceptable signal is stored in counter 94, the last good reading is transferred from memory 95 into counter 94 where it is used to make the next comparison for determining the apparent validity of a distance measurement.

After the memory 95 has stored a predetermined number of apparently valid readings, they are averaged and used to provide a readout of the distance to the microprocessor. The microprocessor converts these readings into a meter needle deflection. Therefore, the pilot is only required to hold the needle over a suitable dial scale marking.

FIG. 6 illustrates how the combined altitude of the aircraft and height of the transponder antenna affects the radar guidance system. The surface of the earth is curved; therefore, the combined altitude $h_1$ of the aircraft antenna 76 and height $h_2$ of the transponder antenna 74 should be high enough so that there is an unobstructed line of sight 100 between the two antennas.

FIG. 7 illustrates the problem if there is too much difference between the altitude of aircraft 66 and the heights of the two transponder antennas 92, 93. The actual distance between the two transponders is a straight line 101. The aircraft 66 is flying high above the antennas 92, 93 so that the apparent distance between the antennas is the sum of the two distances 104, 106, which is considerably greater than the true distance 101. (FIG. 7 is a two-dimensional drawing showing altitude only; it has nothing to do with the horizontal or distance measurements 69, 70 of FIG. 1.) In general, the difference between the aircraft altitude and the antenna height times 10 equals the closest distance to the baseline that the aircraft 66 can work with acceptable accuracy.

FIG. 8 illustrates yet another problem. The aircraft should be picking up signals transmitted along line 108 which is the direct path to the aircraft. However, some kind of an obstruction 110 completely blocks reception over the direct transmission path 108. Therefore, the aircraft 66 picks up a secondary signal which is reflected from an object 112. The nature of the object 112 is irrelevant. It could be a chain link fence, another aircraft, or even a weather related condition.

FIG. 9 illustrates still another problem which the radar guidance system faces. Here, the aircraft 66 picks up a signal transmitted directly over the path 114 and a reflection of the signal transmitted over the reflected path 116. In this example, the signals transmitted over the direct path 114 and the reflected path 116 are 180° out of phase with each other. Therefore, they mutually cancel, and the aircraft cannot pick up any signal.

The invention provides a microprocessor controlled system which compensates for each of these and similar problems. In the example of FIG. 3, it is a simple matter of subtracting the time intervals required for the signal to travel over the start wire 79 to the transmitter, to turn around in the transponder, and to travel from receiver 90 over stop wire 91 to counter 80. Each of these delay times may be measured accurately and the microprocessor can be programmed to subtract them.

In the problem illustrated in FIG. 7, it is a simple matter of trigonometry for a microprocessor to compute the true length of a base of a triangle when the altitude is known and the system detects the distance between the aircraft and the antenna.

In the problem illustrated in FIG. 8, the obstruction 110 is almost always associated with a relatively small object which the airplane quickly passes. The Merrick patent and FIG. 5 (above) teach how inconsistent readings are rejected. Thus, if the aircraft is consistently recording distances along the short direct path, including 108, and suddenly the distances jump to that of the long reflected path, the microprocessor recognizes the jump as being greater than is possible for the known aircraft speed. Then, the reading is rejected as being inconsistent.

The problem of FIG. 9 is similar. As the aircraft travels, the 180° phase relationship which results in a complete cancellation is present only when the two distances 114, 116 have a critical relationship. When this happens, the onboard microprocessor simply rejects the inconsistent signals.

Figure 10:
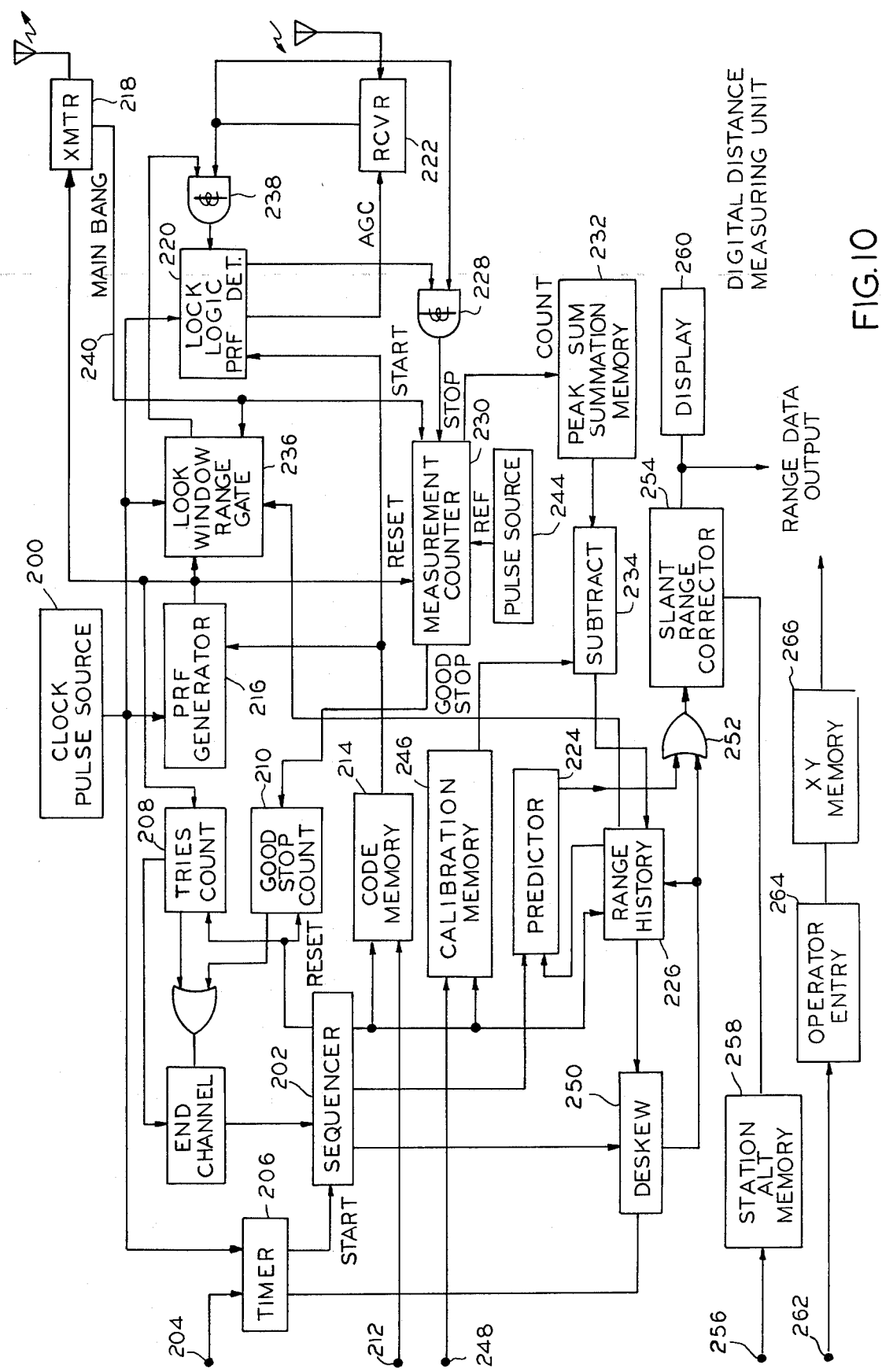
FIG. 10 is a block diagram of a microprocessor which provides a digital distance measuring unit.

FIG. 10 is a block diagram of a digital distance measuring unit, which may include a microprocessor programmed to perform the computations described herein. The measuring unit is driven from a clock pulse source 200 (which may be a free-running oscillator) and controlled by a sequencer 202.

A suitable manual control device 204 enables an operator to set the cycle of timer 206 and thereby select any suitable time frame up to one-half second, for example. Accordingly, every half-second, in this example, timer 206 starts a cycle which drives sequencer 202 through its complete sequence (unless it is still running through its last previous sequence).

As the sequencer 202 steps through its cycle of operation, the various circuits of FIG. 10 are successively enabled. First, there is a reset step which sets the tries counter 208 and good stop counter 210 to zero.

The operator makes a manual adjustment at 212 to select the pulse repetition rate which identifies a particular transponder. That setting is stored in a code memory circuit 214 which is enabled by sequencer 202 on its next step. Thereupon, memory 214 sets the manually selected pulse repetition rate code in a PRF generator 216, which periodically triggers transmitter 218 to send a radar pulse. The memory 214 also sets the selected pulse repetition rate code in a lock logic PRF detector 220 that detects radar pulse signals which are returned from the selected transponder to the receiver 222.

The next operation depends upon what has transpired before. If the radar pulse is the first one that is transmitted (called the "main bang"), the receiver is set to have a range tracking gate or acceptance window which is so wide that the return pulse may be detected regardless of the range. For example, it takes longer to receive a returned radar pulse when the range is, say, 90 KM than it takes when the range is 10 KM. Thus, on the "main bang", the range tracking gate or acceptance window may have a width of 600 microseconds, to insure reception of the returned pulse regardless of the range.

As successively returning radar pulses are received, the range tracking gate or acceptance window of the receiver narrows, and centers upon the expected range, as explained below in connection with FIG. 19. As a history of the returned radar pulses builds, the range tracking gate or acceptance window may narrow to, say, 3 microseconds. Thus, the resolution of the distance measurements increases as a function of the previous history.

This adjustment of the width of the range tracking gate or acceptance window is controlled by the sequencer 202 which successively triggers a predictor circuit 224 and range history circuit 226. On the first transmitted radar pulse, the predictor 224 has no stored indication that any particular range is anticipated. Therefore, in the normal state, the range tracking gate or acceptance window is relatively wide. However, by the time that the first radar pulse is returned, the predictor circuit 224 will have counted down to a particular number which enables it to predict when the next pulse will be received. The range tracking gate or acceptance window will then have a setting which is plus or minus the predicted setting. As the prediction more nearly coincides with the actual time of the returned pulse, the range tracking gate or acceptance window becomes more narrow.

Each time that a radar pulse is returned, it is picked up by the receiver 222 and fed through circuits 228, 230, 232, and 234 to the range history memory 226. The range history memory stores the radar measured range distance to enable an appraisal of the reading and to enable the predictor circuit 224 to determine whether there is a coincidence between the predicted range and the range measurement made by the radar circuit. If no range is found, but a range history is known, the prediction of the range may be used as a valid range. Usually, the predicted range signal carries a "tag" signal which may affect the circuit operations under some conditions.

Each time that the code memory 214 commands the transmission of a radar pulse, the transmitter 218 feeds back a reset pulse which resets a look window range gate 236 and a measurement counter 230. The look window and range gate 236 provides the range tracking gate or acceptance window timing which determines the window width, under control of the range history circuit 226. The measurement counter 230 determines the time required for the radar pulse return and, therefore, the distance to the transponder.

The details of this distance measurement operation are found in the above identified Merrick and Dano patents. In general, the code memory 214 starts a lock logic PRF detector circuit 220 which begins the process of setting a range tracking gate or acceptance window. When the radar pulse is transmitted, the look window circuit 236 is triggered via wire 240. An AND gate 128 is enabled during the range tracking gate or acceptance window while a returning radar pulse is anticipated. If the return pulse is received while AND gate 238 is so enabled, the pulse is accepted. The return pulse is rejected if it is not received while AND gate 238 is so enabled. As the "history" of return pulses increases, the range history circuit 226 causes the look window circuit 236 to enable AND gate 238 for progressively shorter periods of time, as taught in the Dano U.S. Pat. No. 3,938,146.

The determination of the range distance is taught in the Merrick patent. When the transmitter 218 sends a radar pulse and marks wire 240, the measurement counter 230 starts counting reference pulses from pulse source 244. If a radar pulse is received while the lock logic circuit 220 is enabling AND gate 238, the STOP wire is marked and counter 230 stops counting the reference pulses from source 244. The count stored by measurement counter 230 is then passed through circuits 232, 234 to the range history circuit. (The automatic gain control for the receiver 222 is provided by the lock logic circuit 220.)

The fact that the return radar pulse appears while the AND gate 238 is enabled indicates a probable "good stop". The peak sum summation memory circuit 232 stores a history of good readings. Therefore, it is able to determine that the reading of the last received radar pulses is consistent with previous good readings.

Each "good stop" signal received by the measurement counter circuit 230 is counted by the good stop counter 210. After a predetermined number of good stops have been received, the counter 210 resets the sequencer 202 and the entire cycle repeats the next time that it is started by the timer 206.

The calibration memory 246 is a manually set device (controlled from 248) which corrects for variables such as the turn around time in the transponders, system delays, etc. The subtract circuit 234 subtracts the calibration setting from the peak sum reading stored in memory 232 and stores the correct range value in the range history circuit 226.

It is also possible that the system cannot obtain a sufficient number of "good stops" to insure accuracy. For example, the large tree and windmill in FIG. 1, the unacceptable height difference in FIG. 7, the obstruction in FIG. 8, or the phase cancellation in FIG. 9 may all contribute to unbelievable readings and, therefore, to a loss of "good stops".

To provide for this contingency, the tries counter circuit 208 counts the number of radar pulses which are transmitted under the command of the PRF generator 216. If the tries counter reaches its count before the good stop counter reaches its count, a predetermined number (such as 50-100) of radar pulses have been transmitted without producing a sufficient number of good stop readings. The tries counter 208 then resets the circuit, and the sequencer 202 recycles when it is next triggered from timer 206.

Since the sequencer is reset before the end of its normal cycle, the range history circuit 226 does not receive an accept signal (i.e., an acceptable number of good stops) and it retains the last good data. Sequencer 202 commands predictor circuit 224 to set the width of the acceptance window, if it can do so, depending upon the prior distance readings. Predictor circuit 224 responds if there is enough current data in the range history circuit 226 to enable a probable setting. If no ranging is possible at a given time, this circuit may use previously acquired data to create a probable range reading. Otherwise, the acceptance window gate width returns to the full width which occurs when the system is switched on.

When the ranging is complete and accurate, the measurement is "deskewed" in circuit 250. Deskewing is a timing function which places all readings on the same time scale. More particularly, the ranging data is acquired from the remote transponders, which act individually, one at a time. During the interval between the two successive readings of the two transponders, the airplane flies some distance so that the two readings are not taken relative to the same point in space. The deskewing circuit subtracts the time differential between the two readings so that they become as if they were taken at the same point in space.

Therefore, so that all of the measurements will be on the same time base, the range information is corrected in circuit 250, relative to the start signal from timer 206, by counting down cyclically recurring pulses to subtract elapsed time from the apparent distance readings. Thus, the corrected information from the deskew circuit 250 and the information from the predictor circuit 224 are fed through OR gate 252 to a slant range corrector circuit 254.

The operator makes a manual setting at 256 which stores the aircraft altitude in a memory circuit 258. That information is fed into circuit 254 which calculates the horizontal distance. For example, the lengths 104, 106 (FIG. 7) of two sides of a triangle are known from radar readings and the altitude of the triangle is known from the manual setting at 256. Therefore, only a simple trigometric calculation is required to find the actual range 101.

The output of the slant range corrector 254 is used to operate any suitable display device 260. The term "slant range" means that, at some convenient time, the system may be calibrated to accommodate readings taken on the slant. The device 260 may be a meter, a digital display, or any other suitable device. When the aircraft is flying a few feet above the ground, the pilot may not be able to safely shift his eyes away from the surface of the earth. Therefore, the display 260 may be a device which is positioned outside the cockpit and in the pilot's normal line of vision. For example, it could be a meter displaying a large bar graph, the end of which should remain at a center position. If the end of the bar moves left or right, for example, the pilot corrects his course to bring it back to the center display position.

The manual control 262, interface circuit 264 and X, Y position memory circuit 266 may provide any suitable information, such as the desired flight pattern, location of three or more transponders, etc., to enable further sophistications of the display.

Figure 11:
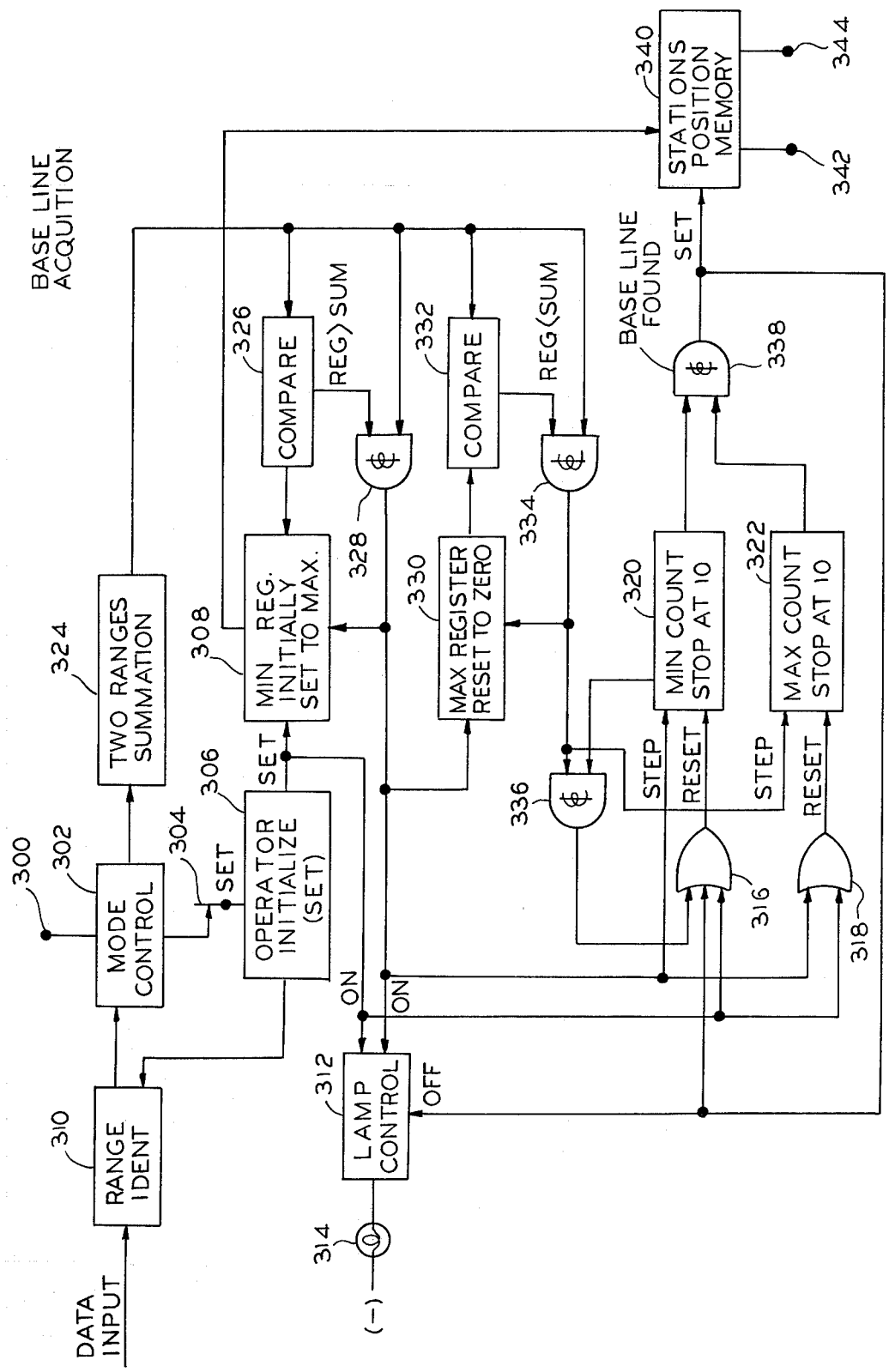
FIG. 11 is a block diagram of a circuit for acquiring the distance of the baseline.

FIG. 11 shows the details of a circuit used for determining and storing the length of the baseline. It will be recalled that before the pilot begins the pattern flying, he flies over baseline 68 (FIG. 1) and stores a memory of the length of the baseline, which is the minimum sum of the lengths of the lines 69, 70.

To store the length of the baseline, the pilot operates a manual control device 300 which starts a mode control circuit 302 (FIG. 11) and places the equipment in a condition to determine and store the length of the baseline. Then, as the pilot flies toward the baseline, he closes a set switch 304 to start the baseline measuring sequence. An initializing or start circuit 306 stores a maximum distance setting in a minimum register 308. The circuit of FIG. 11 reduces this setting to a minimum setting which is the length of the baseline. The minimum setting occurs when the two lines 69, 70 (FIG. 1) become substantially a straight line 68, or (since there is some altitude) the closest approximation thereof.

The initializing circuit 306 also triggers a range identification circuit 310 which enables the radar data input from the identified transponders to be fed into the circuit of FIG. 11. Thereafter, circuit 310 ignores all data input except that coming from the selected transponder stations.

The set switch 304 also lights a lamp control circuit 312 that turns on a lamp 314, which remains on until a minimum range is found. Finally, the operation of set switch 304 acts through OR gates 316, 318 to reset two counters 320, 322 to zero. The circuit is now ready to receive the radar data which indicates the lengths of the two lines 69, 70, which lengths are added together in the circuit 324.

As the aircraft approaches the baseline, the successive distance measurements are reduced on each recording. If the value stored in circuit 324 is less than the value in circuit 308, as determined by the compare circuit 326, AND circuit 328 conducts and sets a new minimum value into circuits 308 and 330, steps circuit 320, and resets circuit 322. This sequence repeats until the readings reach a minimum as the aircraft crosses the baseline. The AND gate 328 also conducts to hold the lamp 314 in a lit condition as long as the aircraft approaches the baseline.

The circuit of FIG. 11 knows when the airplane crosses the baseline because the sum of the distances 69, 70 stops reducing.

During the reducing distance measurements before the baseline is crossed, the compare circuit 332 compares the value stored in circuit 330 with the value stored in circuit 324. As long as the distance is reducing there is no output from circuit 323.

When the aircraft crosses and thereafter is leaving the baseline, the stored distance is less than the measured distance, and the successive distance readings increase. The signal from compare circuit 326 disappears from the upper input of the AND gate 328. As the sum of the distance measurements of lines 69, 70 increases, the compare circuit 332 gives an output, and a signal appears at the upper input of the AND gate 334. Therefore, as the AND gate 334 conducts, it steps a maximum counter 322, and the count stored in circuit 330 is increased. If the counters 320, 322 reach a count of ten the AND circuit sets a minimum value, which has been saved in circuit 308, into memory circuit 340, which then stores the length of the baseline.

The pilot only has to fly over the baseline once. However, on occasions, he may wish to try for a better reading. If so, he flies back and forth over the baseline 68 (FIG. 1) any suitable number of times. Each time that he does so, he looks for a shorter distance which means that he has achieved a reading for a straighter baseline.

The output of the AND gate 338 operates the lamp control circuit 312 to switch off the lamp 314, thereby informing and confirming to the pilot that the baseline distance has been stored.

If the AND gate 336 conducts, it means that the detector 332 suddenly indicates that the baseline is increasing, before the count in circuit 320 reaches "10" (indicating ten good tries). This, in turn, indicates some kind of problem. Perhaps, something deflected, reflected or absorbed enough signals to defeat an acquisition of ten good readings. When AND gate 336 conducts, the counters 320, 322 are reset and the baseline data storage is cancelled.

If the pilot knows the locations of the two transponders 58, 60, he may also use manual controls 342, 344 to set the locations directly into the position memory. Usually, these positions are expressed in terms of X and Y coordinates in the flight pattern (FIG. 2). For example, one transponder location could be set as "X10" and "−Y2" while the other transponder location could be set as "−X10" and "Y15". Then, all of the flight paths are taken relative to those two points.

Figure 12:
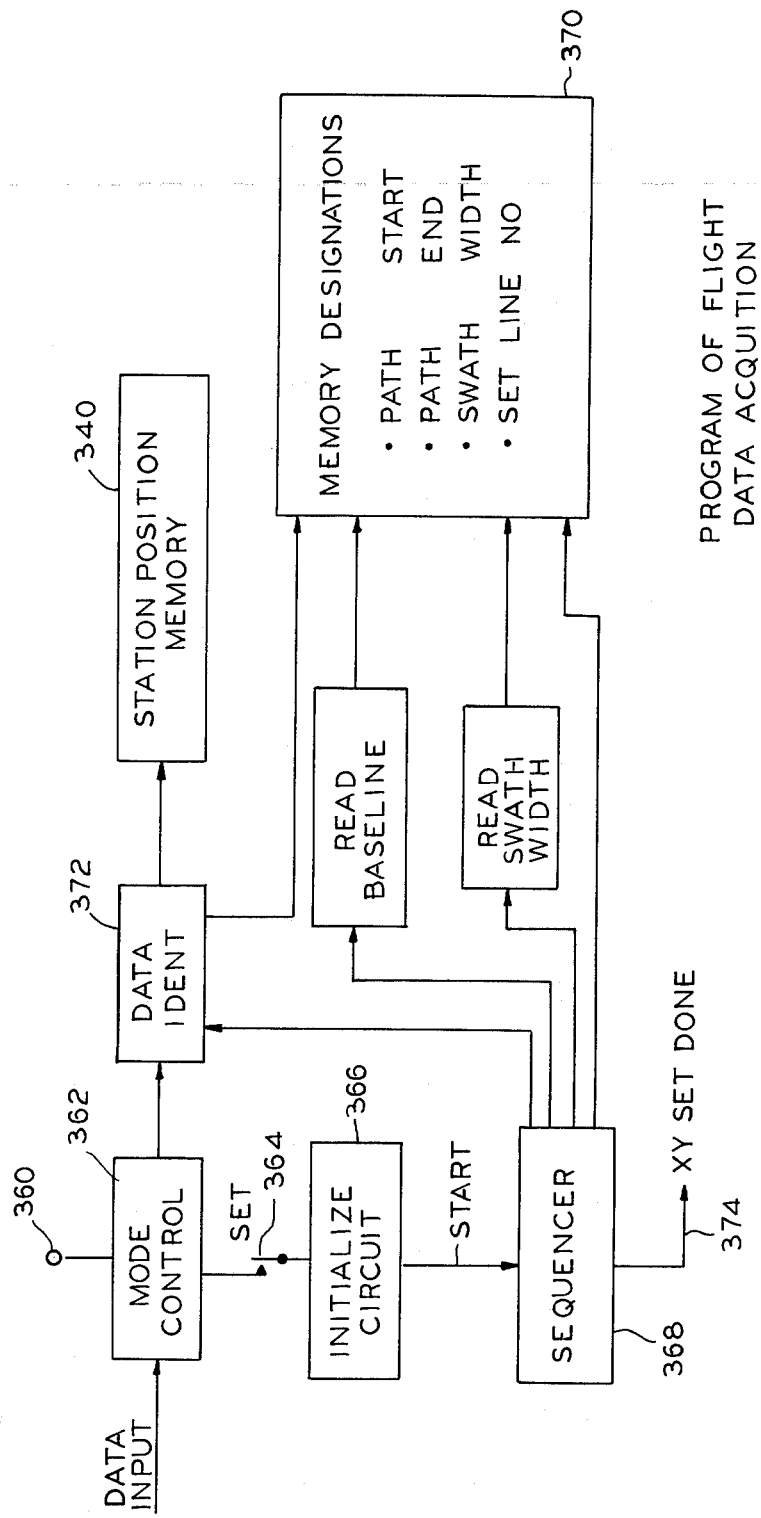
FIG. 12 is a block diagram of a circuit for acquiring and storing a program of flight data.

The circuit of FIG. 12 enables the operator to set pertinent data into the system memories. A manual control device 360 is operated and the mode control circuit 362 is enabled to receive data input. Then, a set switch 364 is closed to enable an initializing circuit 366, which starts a sequencer 368 and sets all circuits to a normal or starting condition.

The circuit is now in condition to receive data which may be input from any suitable sources. The pilot may key data into the circuit or a microprocessor may supply it, for example. These data are entered into memory 370, one at a time, under control of the sequencer 368. Thus, on sequencer step 1, the identification code (a pulse repetition rate) of the selected transponder is entered into the circuit 372. The X, Y positions of the transponder stations are stored in the station position memory 340 and in memory 370, as described above in connection with the operation of FIG. 11.

Next, the sequencer 368 steps on to store a memory of the baseline length which was also found by the circuit of FIG. 11. On the next sequencer step, the swath width is stored into the memory 370, usually by a manually operated keyboard. On the final step, the sequencer 368 enables a line number set. For example, in FIG. 1, the field enclosed by the line 67 may be smaller by one swath width than shown. Therefore, the pilot might key in "2", which means that the pattern flying would begin with path 2 instead of with path 1.

On the next to last sequencer step, the memory 370 stores the X, Y coordinates of the check points 77, 78. If the pilot knows these coordinates, he may key them directly. Usually, however, the pilot simply flies over the check points 77, 78 and pushes a button when the aircraft is directly over the check point (FIG. 13). The memory 370 stores the aircraft location when these pushbuttons are operated, to store the start and end positions 77, 78 of the first flight path. On the final sequencer step, a wire 374 is marked to indicate that storage of the basic preflight data has been completed; for example, a light may be lit.

To store the locations of the check points at the start and end positions 77, 78 (FIG. 1), the pilot operates a manual control device 400 (FIG. 13) which enables a mode control circuit 402. A range identification circuit 401 identifies the radar signals which are then being received on the aircraft. The mode control circuit identifies, sorts out, and routes the incoming radar data into the various circuits. The mode control circuit 402 starts a sequencer 403.

A range to X, Y position locator circuit 404 converts the ranging information derived from the radar signals into X and Y coordinates in the flight pattern (FIG. 2). More correctly, the X, Y coordinates are relative to the positions of the transponders, as stored in the station position memory 340.

When the pilot sees that he is flying over the start 77 of a selected flight path, he operates a switch P1 to record a first flight position. With a sequencer 403 standing on its first step, and with the switch P1 operated, the X, Y coordinates then being read by the range to X, Y position locator 404 pass through the AND gate 406 and are stored in memory 408. The output from the AND gate 406 also feeds through the OR gate 410 to step the sequencer 403 to its second step, thereby changing over to prepare for storage of the P2 locations.

When the pilot sees that he is flying over the end 78 of the initial flight path, he operates a switch P2. At that time, there is a coincidence at AND gate 412 and the X, Y reading then being found in circuit 404 is stored in memory 408. The output of AND gate 412 feeds through the OR gate 410 and steps the sequencer 403 to its third step.

On the third step, the sequencer begins an automatic stepping sequence to read circuit 413 and thereby store the swath width, to read circuit 415 and thereby store the baseline and flight path number. Then, the sequencer stops to operate the circuit 414 and thereby display the number of the flight path. Thereafter, and throughout the entire flight pattern, the current flight path number is displayed at 414.

FIG. 14 shows the flight pattern relative to the sprayed field. FIG. 2 shows an exemplary flight pattern, relative to the path actually flown by the pilot, which produces the field pattern of FIG. 14. Stated another way, the field is sprayed in parallel lines regardless of whether the aircraft is following a race track course or flying in one of the other patterns.

From the viewpoint of the sprayed field, there is a center line C1 and a first grid line left (L1) and right (R1) of the center line. Then, there is a second grid line left (L2) and right (R2) of the lines L1, R1, etc. Accordingly, there should be an identification of whether a path is left or right of a center line. Of course, it is not necessary for center line C1 to be in the middle of the pattern—it may be off-center.

Figure 15:
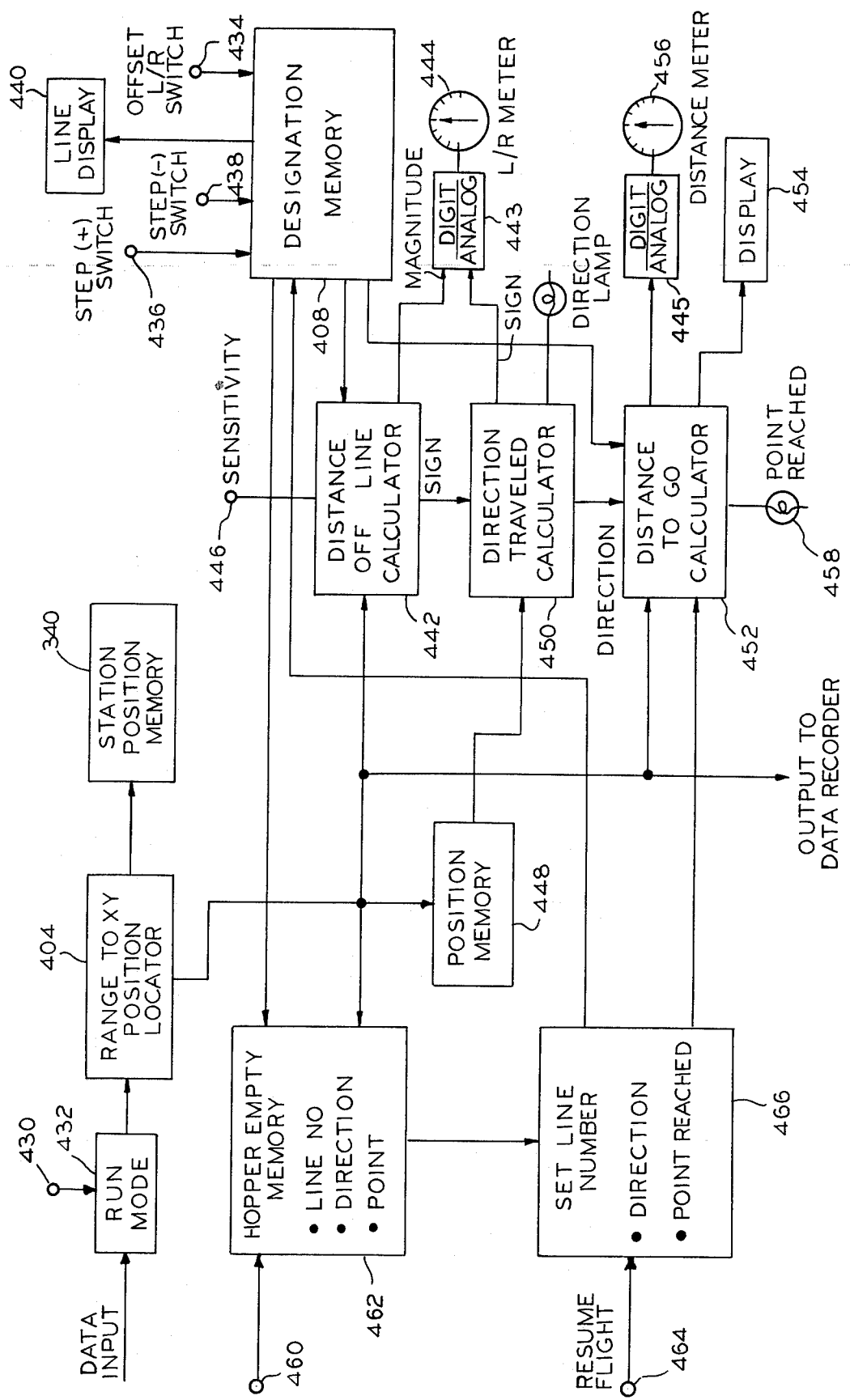
FIG. 15 is a block diagram of a direction and distance circuit.

FIG. 15 shows a circuit for calculating whether the aircraft is following a path which is on the left or right of the center line. Again, the radar derived data is fed in through a data input terminal. The pilot operates a suitable manual switch 430 to enable a run mode circuit 432 which screens the incoming data. The range to X, Y position locator 404, designation memory 408, and station position memory 340 are the same circuits that are seen in FIG. 13.

The manual offset L/R switch 434 is set by the pilot to indicate which grid lines (FIG. 14) are left or right of the center line. For example, in FIG. 1 all of the flight path lines are to the right of line 1, while in FIG. 14 the lines are equally distributed on the left and right of the center line. Manual switch 434 sets this information into the designation memory 408.

The two manual step switches 436, 438 enable the pilot to step a display of the flight line identifications to the path that he is actually traversing. Thus, for example, if he starts on line 3 of his grid pattern, he operates the left or right step switch three times. Thereafter, a suitable line member display 440 always indicates the flight path which the aircraft is then traversing.

The designation memory 408 contains a stored memory of the desired flight path. Any suitable pattern may be used. A distance off line calculator circuit 442 compares the actual X, Y aircraft location derived from radar data, with the theoretical X, Y location supplied by the designation memory 408, and calculates the difference. The calculator circuit 442 may contain a settable scale so that the maximum expected deviation causes a full scale meter deflection. The resulting calculated digital output signal is fed into a digit-to-analog converter 443 for driving the analog meter 444. The pilot keeps the needle of meter 444 (or another suitable indicator) at a center scale reading, and he is then on course, regardless of how it may twist and turn. Also, if the aircraft is exactly on course, a lamp 445 lights. A manual control device 446 enables the pilot to adjust the sensitivity of the circuit response.

As the pilot flies and the radar signals produce successive position locations, the circuit 404 converts them to give the aircraft's X, Y locations on the grid (FIG. 14). Each such X, Y position locations is stored in a memory circuit 448. These stored memory signals drive a calculator 450 which determines the direction of travel. The calculator 450 sets the meter 444 to a scale position which corresponds to the direction of the aircraft travel. The magnitude of the deviation from the true course is signalled by the calculator 442 and the left or right deviation is signalled by the calculator 450.

For any given flight path, the distance to go calculator 452 compares the distance along a given flight line over which the aircraft has traveled from the start line to the total distance of a flight line which was set by the pilot as the aircraft flew from point P1 to point P2 (FIG. 14). Calculator 452 also compares the flight pattern stored in the designation memory 408 with the actual X, Y location in the position memory 448. The present position data determines the location of the aircraft in the flight pattern relative to the stored memory of points P1, P2. The direction of travel calculator determines whether flight is toward the "start" line or the "end" line. (From another viewpoint, the designations "start" and "end" lines may reverse each time that the aircraft circles and flies in an opposite direction.)

The display 454 gives a numerical readout of the distance to go along any given flight line (L1, R1, L2, R2, etc.) in terms of miles or kilometers. The meter 456 may also provide a fine scale reading by indicating the distance to go when the aircraft is within a half mile or so from the end line. A lamp 458 signals the instant when the end line is crossed.

As the aircraft exhausts the chemical being sprayed, there is a suitable signal. The pilot may operate a manual control 460 or a hopper sensor may trip a switch. Responsive thereto, a memory circuit 462 takes in and stores all relevant data that identifies the aircraft's then existing position location. This data includes the X, Y position location then stored in the circuit 404 and the corresponding pattern location taken from memory 408.

When the pilot returns with a full hopper, he operates a manual resume flight control device 464. The data which was previously stored in the circuit 462 is read from the memory and into a command circuit 466, which causes a readout on the meters 444, 456. These meters indicate the direction, deviation, and distance to go relative to the X, Y coordinates at the point when the hopper became empty. As the aircraft crosses those coordinates, flying in the correct direction, the lamp 458 is lit and the pilot starts the spraying.

Figure 16:
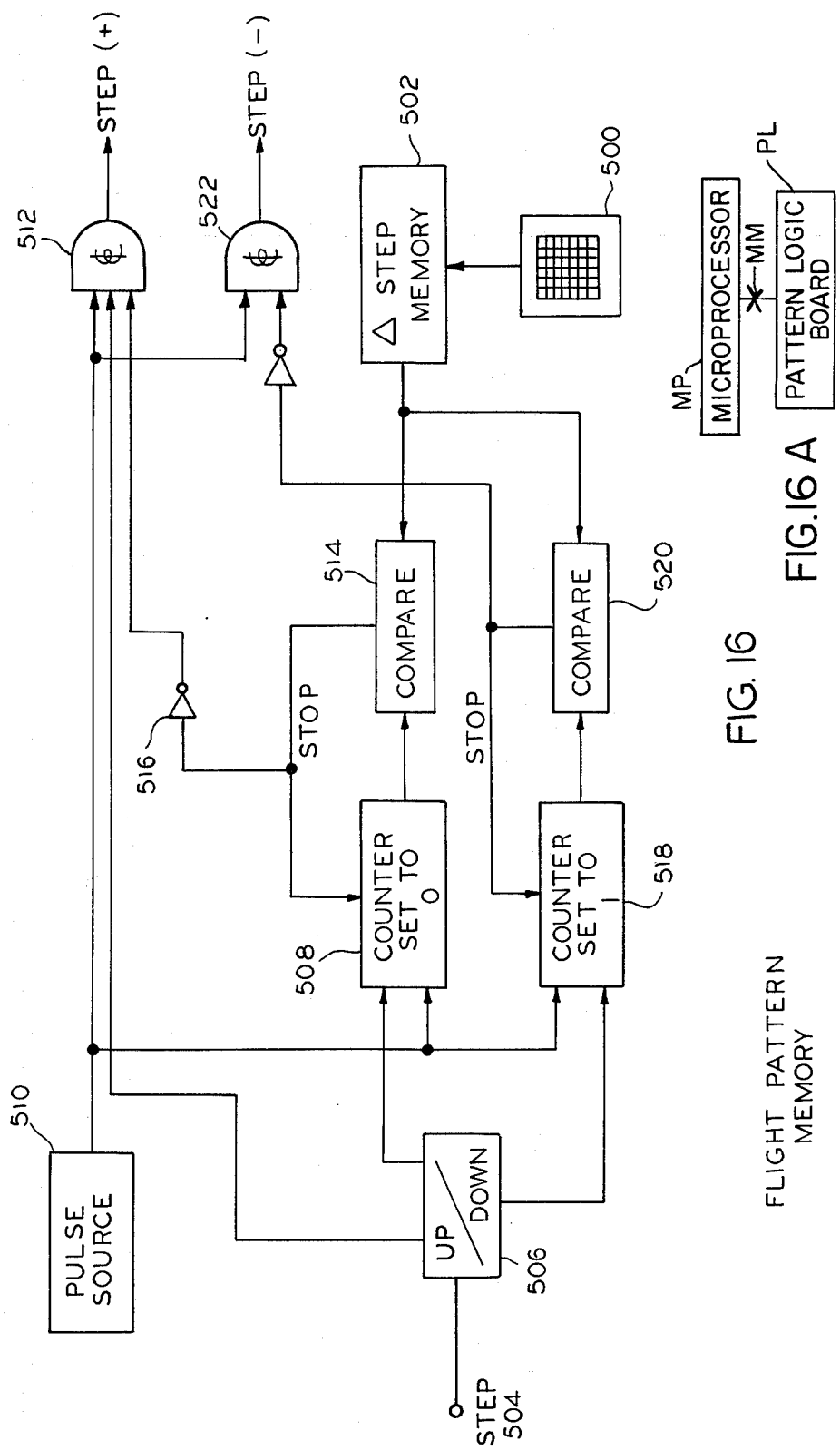
FIG. 16 is an exemplary flight pattern memory circuit.

One example of a flight pattern control circuit is found in FIG. 16. The pilot either knows or guesses at the number of flight paths in a given area, which number is keyed or dialed at a control panel 500, and stored in a Δ step memory 502. Then, he presses a "step" pushbutton 504 to command the pattern circuit (FIG. 16) to step off the number of lines in the anticipated flight pattern.

Responsive to the operation of the manual control switch 504, a flip-flop 506 operates to its "up" side to set a counter 508 to zero. A pulse source 510 drives the counter 508 one step for each flight path, as it is completed. Each time that there is a pulse from source 510 there is a coincidence at the AND gate 512 which is applied to the step (+) terminal 436 in FIG. 15.

When the count in circuit 508 corresponds to the number keyed into memory 502, a compare circuit 514 issues a stop command. An inverter 516 switches off and terminates the AND condition at gate 512. The pilot has now flown over the number of paths that were originally keyed at control panel 500 when the flight plan was made. If he views the area being sprayed and judges that one or more passes are required, he pushes the step switch 436 (FIG. 15) one or more times.

If the flight patterns extend in an opposite direction, control 504 is operated in another manner to set the flip-flop 506 to a "down" position. The counter 518, compare circuit 520 and AND gate 522 step the designation memory 408 in a negative direction.

Other patterns are provided by altering the manner in which the counters 508, 518 respond. For example, they do not have to count 1, 2, 3, etc. They could also count 1, 3, 2, 5, 4, etc.

Means are provided for finding the peak average of the radar readings. More particularly, the foregoing description and the above cited patents make a point that the accuracy of the radar system is improved if a number of separate readings are accepted as consistently probable and are then averaged. However, this averaging technique may be made still more accurate if compensation is provided for the naturally occurring variances in the distance measuring system. For example, experimentation has shown that the described system consistently tends to overestimate the distance more often than it tends to underestimate it. Thus, a simple process of adding a column of figures and then dividing the sum by the number of entries produces an average distance which is typically longer than it should be.

By way of example, consider a hypothetical radar system which produces the following readings:

|   |   |
|---|---|
|   | 145 |
|   | 150 |
|   | 155 |
|   | 160 |
|   | 145 |
|   | 140 |
|   | 150 |
|   | 145 |
|   | 150 |
|   | 145 |
| Total | 1,485. |

If these readings are added (1,485) and then the sum divided by the number of entries (10) to find an average (1,485÷10), the distance appears to be 148.5.

Figure 17:
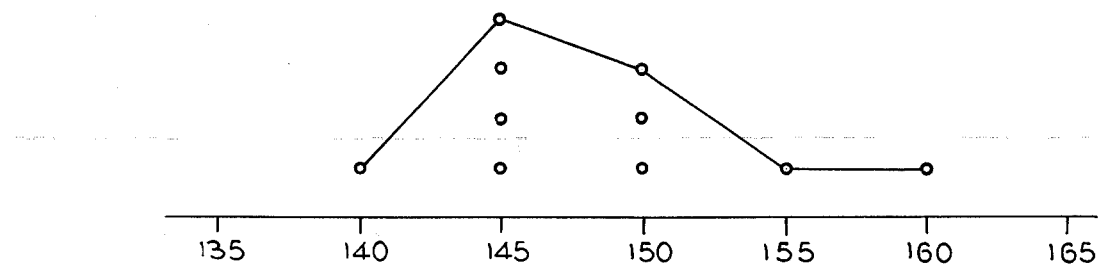
FIG. 17 is a graph for explaining how accuracy may be improved by peak value averaging.

Next, plot the readings set forth in the above column, as is done in FIG. 17 (i.e., the above column of numbers contains on occurrence of 140, four occurrences of 145, ... etc.). If a person looks at the resulting graph (FIG. 17) and tries to intuitively guess at the center where one-half of the area under the curve is to the left of the center and the other half of the area is to the right of the center, the guess will probably lead to an estimate of about 147 (a little less than half way between 145 and 150). Or, stated another way, it is unlikely that the guess would be the average 148.5 calculated above.

This variation between the estimate and average is probably because the viewer's eye tells him to disregard the reading of "160" as an apparent mistake or wild reading. When this 160 reading is eliminated from the above calculation, the average becomes 147.2 (1,325÷9=147.2).

If an attempt is made to build a circuit which can decide whether or not to accept a reading (e.g., 160 in the above example) in real time, the decision making circuit must react so quickly that the cost of its components becomes prohibitively expensive.

On the other hand, a counter may be driven responsive to each reading that is developed from radar signals. A count may then be incremented and stored at the address of each of these readings. Thus, as the data set forth in the foregoing column of numbers are received, a count of "one" is stored at the counter addres "140"; a count of "four" is stored at the address "145"; etc. After these counts are stored at each of these addresses, the counter is, in effect, storing a bar graph, as shown in FIG. 17. Thus, a decision based on this bar graph may be made at a relatively slow speed after all of the radar derived readings have been received.

Figure 18:
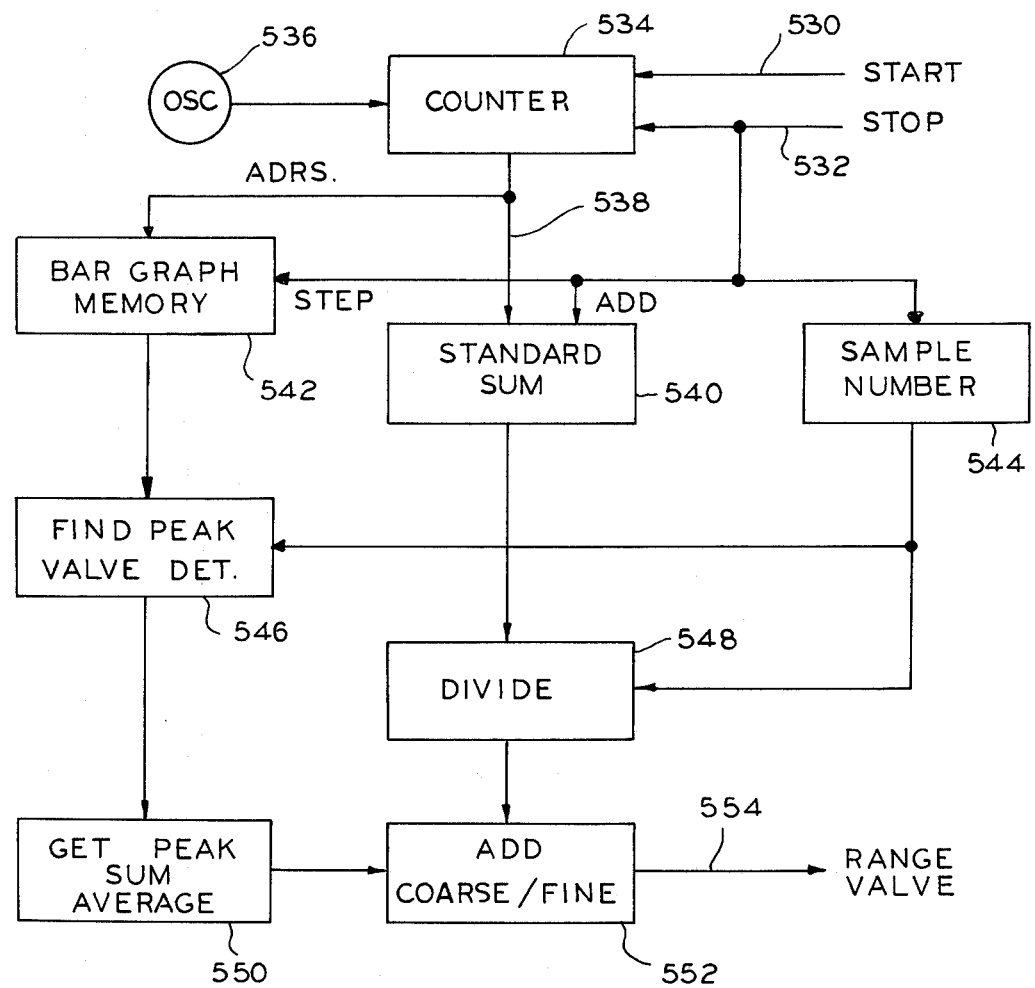
FIG. 18 is a block diagram of a system for making the peak value averaging depicted in FIG. 17.

A circuit for finding an average distance by this bar graph technique is seen in FIG. 18, which may be part of a microprocessor, for example. The transmission of each radar pulse marks a start wire 530 and the receipt of each returned radar pulse marks a stop wire 532.

During the interval between the appearance of markings on these start and stop wires 530, 532, a counter 534 counts pulses from a standard source, such as the output of a crystal controlled oscillator 534, for example. Thus, the count stored in counter 534 is precisely related to the total elapsed time (and therefore the distance) required for a round trip of the radar pulses.

The output of counter 534 is a stored number indicating the number of oscillator pulses which are counted between the appearances of pulses on the start and stop wires. This stored count appears on wire 538 at the output of circuit 534. When the stop signals appears on wire 532, a conventional adding circuit 540 is triggered to add the count appearing on wire 538 to the sum previously stored in circuit 540.

The count appearing on wire 538 drives a shift register in a bar graph memory 542. When the stop signal appears on wire 532, the shift register in counter 542 is standing on a particular step which amounts to an "address". The stop signal appears at the STEP terminal of circuit 542, which causes a memory in circuit 542 to store a signal indicating that the count stopped there. In the example of FIG. 17, the bar graph memory circuit 542 is indexed four times at the address of count "145", responsive to four stop pulses appearing on wire 532 and at the STEP terminal of circuit 542.

Each stop pulse received on wire 532 also steps a sample number counter 544, thereby storing a memory that a successful radar reading has been accepted. Thus, the sampling is continued until a predetermined number of good stop signals are received. When the sample number counter 544 reaches a preprogrammed count, a trigger signal is sent to a peak value detector 546 and to a divide circuit 548. The divide circuit 548 divides the sum stored in circuit 540 by the number of sample entries that are counted in circuit 544. In the hypothetical readings set forth in the above column, the sum "1,485" is stored in the summing circuit 540 and the number "10" is stored in the sample number counter 544. Therefore, the division performed in circuit 548 produces the simple arithmetic average 148.5.

The peak value detector 546 detects the maximum count stored at any given address in the bar graph memory circuit 542 (the value "145" occurred most often in the example of FIG. 17). Then, it takes the readings at each of the two adjacent addresses on each of the opposite sides of the peak value 145. Thus, for the data given by the graph of FIG. 17, a peak sum averaging circuit 550 receives the following readings: $(135 \times 0)+(140 \times 1)+(145 \times 4)+(150 \times 3)+(155 \times 1)= 1,325 \div 9 = 147.2$.

Accordingly, the circuit 552 receives the average "148.5" from circuit 548 and the average "147.2" from the peak sum averaging circuit. The average of these two values is read out over wire 554 as the range value "147.8".

Means are provided for logically selecting one of many possible radar pulses as the most probable pulse to be accepted. The radar pulses are received from many sources, other than the transmitter which is supposed to be monitored. The sources of false pulses are many and varied, a few of which are explained above in connection with FIGS. 1–9. Therefore, means are desired for rejecting unwanted signals and accepting the wanted signals. The Dano U.S. Pat. No. 3,938,146 teaches that this means may be provided by a circuit which forms acceptance windows, during which a radar pulse must appear in order to be accepted.

If the acceptance window is very narrow, the reading is very accurate. However, it is not possible to make the window as narrow as it can be unless the range is known before the pulse is accepted. Thus, the problem is to provide a window which is initially wide enough to accept a valid pulse from any distance within range of the system, and yet narrow enough to given very precise readings by rejecting spurious pulses.

The invention uses a trend filter which varies the width of the acceptance window as a function of the recent radar readings. The object of such a trend filter is to inform the controls as to the expected range readings so that the width of the acceptance window may collapse as a history of valid readings accumulates. The collapse of window width is centered on the anticipated reception of the radar pulse.

Figure 19:
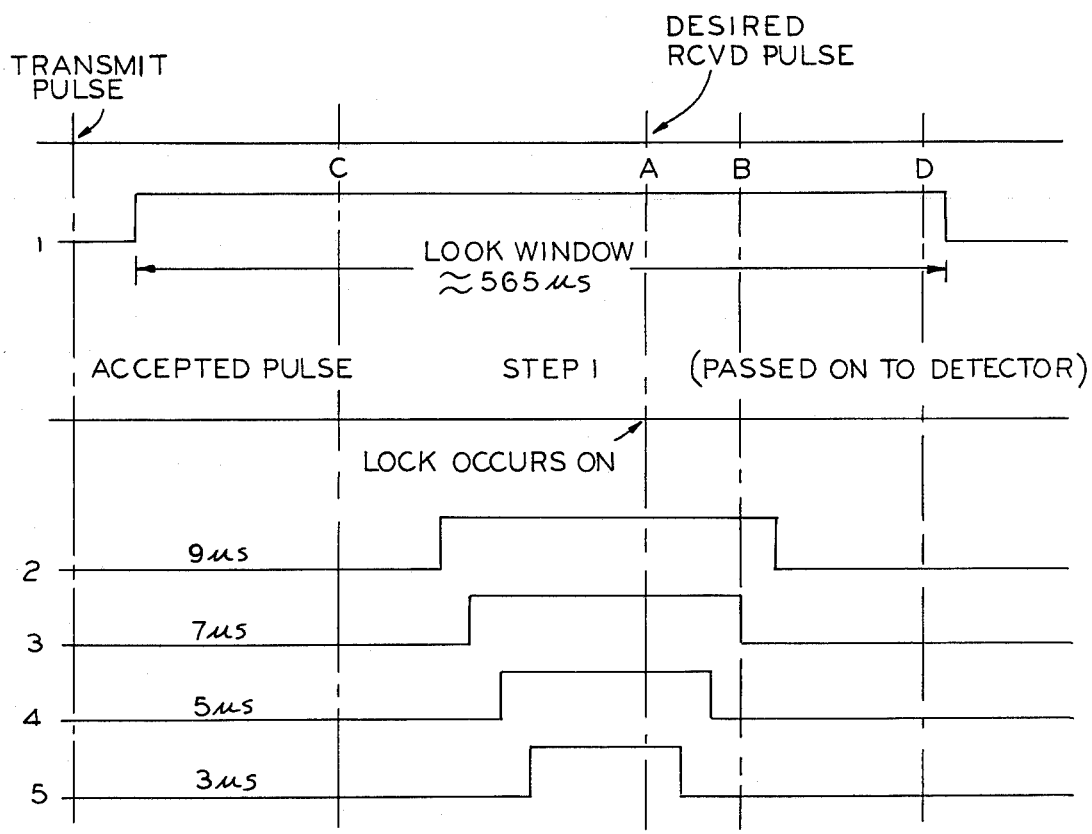
FIG. 19 is a family of curves showing how the range tracking gate or acceptance window width control excludes improper signals.

FIG. 19 is a graphical representation of the manner in which the acceptance gate operates. The uppermost line in FIG. 19 indicates a number of pulses appearing in the frequency band used by the system. The radar pulse is transmitted at a time marked "TRANSMIT PULSE". Return pulses of the same type are received at the lines A, B, C, D, but only the pulse A is the true distance indicating return pulse which is to be selected and read. Pulses B, C, and D must be rejected on a basis of a logical decision.

Initially, the acceptance or "Look" window (line 1) is in the order of 565 microseconds wide, which is wide enough to accept all of the pulses A, B, C, D. As soon as the pulse A is identified as the desired pulse, the acceptance window locks on that position and begins to collapse, first to a width of 9 microseconds (line 2). By inspection of FIG. 19, it is seen that this acceptance window has blocked acceptance of pulses C and D. The next pulses are received in the acceptance window which builds confidence that they are valid pulses because the spurious pulses recur at random intervals.

A continued acceptance of recurring pulses in the position "A" causes the acceptance window to collapse further to the widths of 7 microseconds (line 3), 5 microseconds (line 4), and 3 microseconds (line 5). If the system had tried to lock on pulse "C", the gates would not have so collapsed since pulse "C" would not occur at the same relative time because the airplane position would change quickly relative to nearby reflectors, shifting clouds, phase cancellation, and the like. From an inspection of FIG. 19, it is seen that the pulse in the position B is logically eliminated when the acceptance window collapses from 7 to 5 microseconds. Thereafter, the only pulse which can be accepted is pulse A which appears during the recurring 3 microsecond window of line 5 (FIG. 19).

If any 3 microsecond acceptance window occurs, but no pulse appears, the acceptance window expands to 5 microseconds, then to 7 to 9 microseconds, etc. When pulses begin to recur at the same relative times, the window again collapses around it.

Although only two stations or ranges are required to locate an aircraft position, more ground stations may be provided. Three or more ranges can be taken for validation or position refinement. This multi-station approach may or may not be used in agricultural work. However, as they are acquired, multi-ranges may be recorded for post-flight computer operations.

Multi-user capability is also very important. Several planes may use the same ground reference stations for the normal type of operations. At present, four planes may work at the same time using the same two remote transponders. This is accomplished by a time sharing adapter which forces the update ranging to alternate so that no two planes are ever ranging on the same remote transponder at any one time.

This time sharing is accomplished by causing the system to read a desired code before transmitting in order to determine if the remote transponder is busy because someone else is using it. If the transponder is busy, transmitting is held off until it is no longer busy. Each plane has a different timing interval for waiting after the remote transponder is not busy before it transmits. If the remote transponder becomes busy before this timer ends, some other plane with a higher priority has taken command of the remote transponder and the process continues until all planes are serviced. If the plane cannot obtain access to the remote transponder within a given period of time, a range "fault" occurs and no range data is acquired.

Here the value of deskew and prediction comes into play, for much time can be used up between two ranges. The positioning based on widely timed ranges would be bad and unusable. Also, if, for time sharing reasons, a range cannot be obtained, the predictor may inject a range for continuing operations.

Those who are skilled in the art will readily perceive how modifications may be made without departing from the scope and spirit of the invention. Therefore, the appended claims are to be construed to cover all equivalent structures.

I claim:

1. A vehicular radar guidance system comprising memory means associated with said vehicle for storing an arbitrarily selected predetermined vehicle travel pattern, means responsive to the receipt of radar signals for continuously detecting distances between a vehicle and the two ends of a baseline, means responsive to the detected distances for continuously and automatically displaying a signal of a vehicular course which may be followed to inherently cause said vehicle to follow said predetermined travel pattern, and means onboard said vehicle for rejecting detected distances which are inconsistent with previously detected distances.

2. The vehicular radar guidance system of claim 1 wherein said memory means is a replaceable memory means for permanently storing a predetermined one of a plurality of arbitrarily selected vehicle travel patterns, means for connecting said replaceable memory means into said system, whereby any one of said plurality of travel patterns may be selected by replacing said memory means, whereby said vehicle follows said predetermined travel pattern which is permanently stored in said replaceable memory means.

3. The system of claim 2 and means for storing data relative to the geographical dimensions of said vehicle travel pattern, and means responsive jointly to the stored pattern, the stored data, and the detected distances for altering said display to adapt said travel pattern to the physical configuration of a geographical area.

4. The system of claim 2 and means for storing the position of said vehicle with respect to said stored travel pattern by signals generated while said vehicle is in any one of a number of possible geographical positions corresponding to a desired starting point of said travel pattern.

5. The system of claim 1 and means responsive to the rejection of said inconsistent detected distances for storing the last previously acceptable detected distance for comparison with the next detected distance.

6. A vehicular radar guidance system comprising memory means associated with said vehicle for storing a predetermined vehicle travel pattern, means responsive to the receipt of radar signals for continuously detecting distances between a vehicle and the two ends of a baseline, means responsive to a detection of minimum distances from the vehicle to the two ends of said baseline for storing said minimum distance as the length of said baseline, whereby initial flight data may be acquired when said vehicle approaches, moves over and then leaves said baseline, and means responsive to the detected distances for continuously and automatically displaying a signal of a vehicular course which may be followed to inherently cause said vehicle to follow said travel pattern.

7. The system of claim 6 and means for rejecting said minimum distance detection unless said baseline first appears to become shorter and thereafter appears to become longer.

8. A process for guiding an aircraft responsive to radar signal, said process comprising the steps of:
   a. storing an arbitrary and preselected aircraft flight pattern in said aircraft, each of said flight patterns being stored on an individually replaceable memory means;
   b. continuously receiving radar signals and responsive thereto detecting distances between said aircraft and two ends of a base line defined by two transponders, each transponder having an antenna whereby said aircraft flies at some height above said antenna;
   c. rejecting distances detected in step b. which are inconsistant with previously detected distances;
   d. continuously and automatically displaying an aircraft course jointly responsive to the flight pattern stored in step a. and the radar signals received in step b.; and
   e. following said aircraft flight pattern across an area on the surface of the earth which is removed from said base line by a distance which is at least ten times the difference between the altitude of said aircraft and the height of said antennas.

9. A process of claim 8 wherein there are a plurality of said replaceable memory means, each of said memory means providing for controlling a flight pattern of an aircraft to provide uniform coverage of a predetermined geographic area, said process comprising the added steps of:
   f. selecting one of said plurality of replaceable memory means, each of said memory means permanently storing a different one of many flight patterns;
   g. assembling said selected memory means into a microprocessor control circuit;
   h. storing data in said system indicating geographical dimensions of an area to be covered by said flight pattern; and
   i. storing signals while flying over said area in order to coordinate the physical position of said aircraft with said flight pattern.

10. The process of claim 9 and the added step of correlating the physical position of said aircraft which coordinates in a flight pattern in said memory means to automatically display the locations of said aircraft in said flight pattern whereby the position of said aircraft is continuously displayed as a function of said flight pattern so that said aircraft follows said pattern solely by obeying said display.

11. The process of claim 10 and the added step of using radar signals to operate said display.

12. The process of claim 11 wherein said radar signals are transmitted between said aircraft and two separated points.

13. A system for improving the accuracy of radar readings, especially readings used for vehicular guidance, said system comprising a plurality of stations each of which is identified by a pulse repetition rate which is unique to that particular station, means for transmitting station identification cyclically recurring radar pulses, more than one of said plurality of stations receiving said radar pulses intended only for the station which is identified by the predetermined repetition rate of said transmitted radar pulses, means having a variable cyclically recurring acceptance window width for receiving within a single window both at least a selected one of said cyclically recurring radar pulses at said identification rate and any spurious radar frequency pulses which may occur during said window and which recur at a rate which is randomly different from said cyclically recurring rate, said pulses occurring during said window having substantially any suitable energy content relative to each other, means for progressively narrowing the width of said acceptance window centered upon a pulse which continuously appears in the acceptance window at the recurring repetition rate which identifies a desired station, and means for widening said acceptance window if pulses do not reappear during said acceptance window, whereby said window becomes progressively more narrow as it centers and collapses upon a validly recurring radar pulse at the desired station identification rate regardless of the relative energy content of the various signals.

14. A system for improving the accuracy of radar readings, especially readings used for vehicular guidance, said system comprising means for transmitting cyclically recurring radar pulses at a predetermined repetition rate, means having a variable acceptance window width for receiving said cyclically recurring radar pulses and spurious pulses which recur at a random rate, means for progressively narrowing the width of said acceptance window centered upon a pulse which appears at a recurring repetition rate, means for widening said acceptance window if pulses do not reappear during said acceptance window, whereby said window becomes progressively more narrow as it centers and collapses upon a validly recurring radar pulse, means responsive to each acceptable pulse appearing in said acceptance window for storing an incremental count in a memory to indicate an occurrence thereof, the storage being at a memory address indicating the distance measurement of the accepted pulse, means for detecting the address storing a maximum number of said incremental counts, and means for averaging the distance measurements of pulses stored at the detected address and a predetermined number of addresses on opposite sides thereof.

15. The system of claim 14 and means for giving a simple arithmetical average of the distance measurements and means for combining the average based on said detected address and said simple arithmetical average.

16. The system of claim 14 wherein said memory comprises a counter which counts a predetermined number of clock pulses beginning with a transmission of a radar pulse and ending with the receipt of a returned pulse whereby the count stored in said memory constitutes said address.

17. A process using radar signals for guiding vehicles which move at relatively high speed, the speeds being great enough to cause inaccuracy responsive to the movement of said vehicle between the time when a radar interrogation pulse is sent and the time when the reply pulse is received, said process comprising the steps of:
   a. acquiring on board said vehicle ranging and distance data from a plurality of geographically separated and stationary transponder stations responsive to an exchange of interrogation and reply pulses, whereby inaccuracy may result from the distance traveled by the vehicle during said exchange;
   b. deriving data relative to the distance which the vehicle travels during said exchange and the acquisitions of the data readings from the individual tranponder stations; and
   c. adjusting the data received in step a. by the data derived during step b. to correlate the different positions of said vehicle during said exchange, whereby the readings derived from said two pulses become as if they were taken relative to the same geographical point.

18. The process of claim 17 wherein said data deriving of step b. relative to the distance of vehicle travel comprises the added step of counting cyclically recurring pulses from a stable source during the intervals between said successive readings, and said data adjusting of step c. comprises the added step of adjusting the data acquired from at least one of said transponder stations in response to the counted pulses.

19. The process of claim 17 wherein step a. includes successively reading out more than two of said transponder stations.

20. The process of claim 17 wherein step b. includes deriving said data on a plurality of said vehicles with said onboard data acquisition means.

* * * * *